United States Patent
Greub et al.

(10) Patent No.: US 8,475,200 B2
(45) Date of Patent: Jul. 2, 2013

(54) CABLE INSERTION HAVING UPSTREAM MOUNTING FIXTURE

(75) Inventors: Daniel Greub, St. Gallen (CH); Laif Gadmer, Degersheim (CH); Martin Michael Strasser, Herisau (CH); Michael Lothar Völker, Sax (CH)

(73) Assignee: Huber + Suhner AG (CH)

( * ) Notice: Subject to any disclaimer, the term of this patent is extended or adjusted under 35 U.S.C. 154(b) by 163 days.

(21) Appl. No.: 12/867,088

(22) PCT Filed: Dec. 22, 2008

(86) PCT No.: PCT/EP2008/068138
§ 371 (c)(1),
(2), (4) Date: Sep. 10, 2010

(87) PCT Pub. No.: WO2009/100796
PCT Pub. Date: Aug. 20, 2009

(65) Prior Publication Data
US 2011/0003501 A1    Jan. 6, 2011

(30) Foreign Application Priority Data
Feb. 16, 2008   (CH) .......................................... 232/08

(51) Int. Cl.
*H01R 13/625*   (2006.01)
(52) U.S. Cl.
USPC ......................................................... 439/359
(58) Field of Classification Search
USPC .................... 439/349, 359, 577, 587; 385/92, 385/88, 77, 69
See application file for complete search history.

(56) References Cited

U.S. PATENT DOCUMENTS

| | | | | |
|---|---|---|---|---|
| 4,418,983 A | * | 12/1983 | Bowen et al. | 385/69 |
| 4,547,039 A | * | 10/1985 | Caron et al. | 385/88 |
| 4,711,520 A | * | 12/1987 | Bernardini | 385/76 |
| 4,741,590 A | * | 5/1988 | Caron | 385/60 |
| 4,842,364 A | * | 6/1989 | Chen | 385/136 |
| 4,915,470 A | * | 4/1990 | Moore et al. | 385/94 |
| 4,986,625 A | * | 1/1991 | Yamada et al. | 385/55 |
| 4,993,800 A | * | 2/1991 | Shibata | 385/54 |
| 5,071,366 A | * | 12/1991 | Bernardini | 439/417 |
| 5,180,316 A | | 1/1993 | Miller et al. | |
| 5,192,224 A | * | 3/1993 | Bernardini | 439/471 |
| 5,232,380 A | | 8/1993 | Inoue et al. | |
| 5,271,080 A | | 12/1993 | Hopper et al. | |
| 5,719,977 A | * | 2/1998 | Lampert et al. | 385/60 |

(Continued)

FOREIGN PATENT DOCUMENTS

| | | |
|---|---|---|
| EP | 0154781 A | 9/1985 |
| EP | 0207449 | 1/1987 |
| EP | 1018660 A | 7/2000 |

OTHER PUBLICATIONS

International Search Report dated May 25, 2009, issued in corresponding international application No. PCT/EP2008/068138.

*Primary Examiner* — Alexander Gilman
(74) *Attorney, Agent, or Firm* — Ostrolenk Faber LLP

(57) ABSTRACT

The present disclosure relates to a cable insertion (1) for connecting a cable (7) to a housing (10). The cable insertion (1) includes a connection device (2) having a cantilever-like element (14) having a mounting fixture (11) on the front end thereof for mounting a mating part (3) attached to a jacket (12) of the cable (7). A securing means (4) secures the fixture.

13 Claims, 3 Drawing Sheets

U.S. PATENT DOCUMENTS

| | | | |
|---|---|---|---|
| 5,970,199 A * | 10/1999 | Minchey et al. | 385/134 |
| 5,984,533 A * | 11/1999 | York | 385/70 |
| 6,357,929 B1 * | 3/2002 | Roehrs et al. | 385/59 |
| 6,431,763 B1 * | 8/2002 | Sherman et al. | 385/81 |
| 6,588,947 B2 * | 7/2003 | Mine et al. | 385/92 |
| 7,937,818 B2 * | 5/2011 | Holmberg et al. | 29/450 |
| RE42,522 E * | 7/2011 | Zimmel et al. | 385/55 |
| 2003/0007744 A1 * | 1/2003 | Ngo | 385/86 |
| 2008/0124029 A1 | 5/2008 | Mitamura | |
| 2008/0175541 A1 * | 7/2008 | Lu et al. | 385/62 |

* cited by examiner

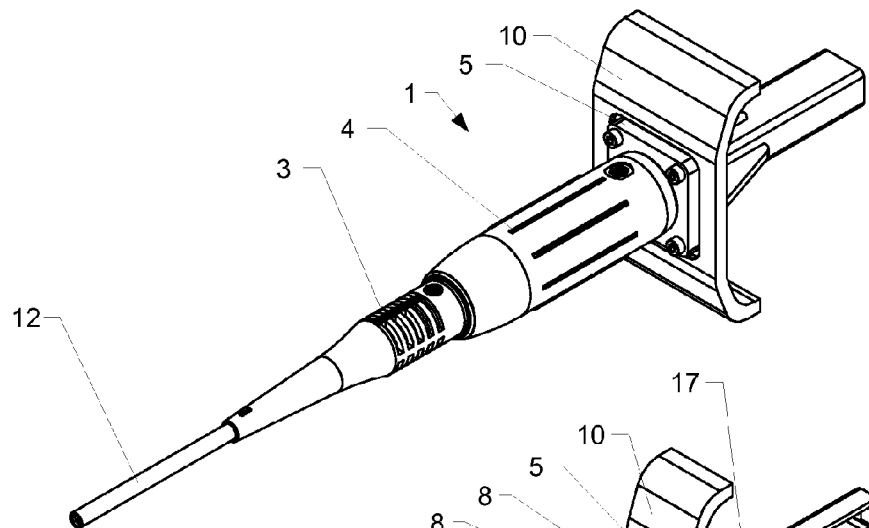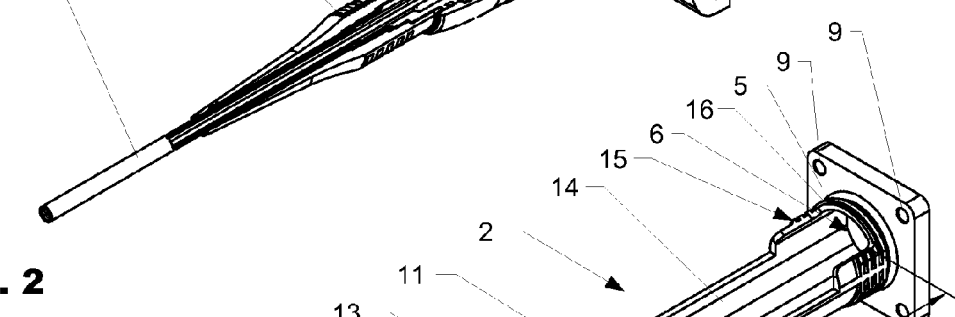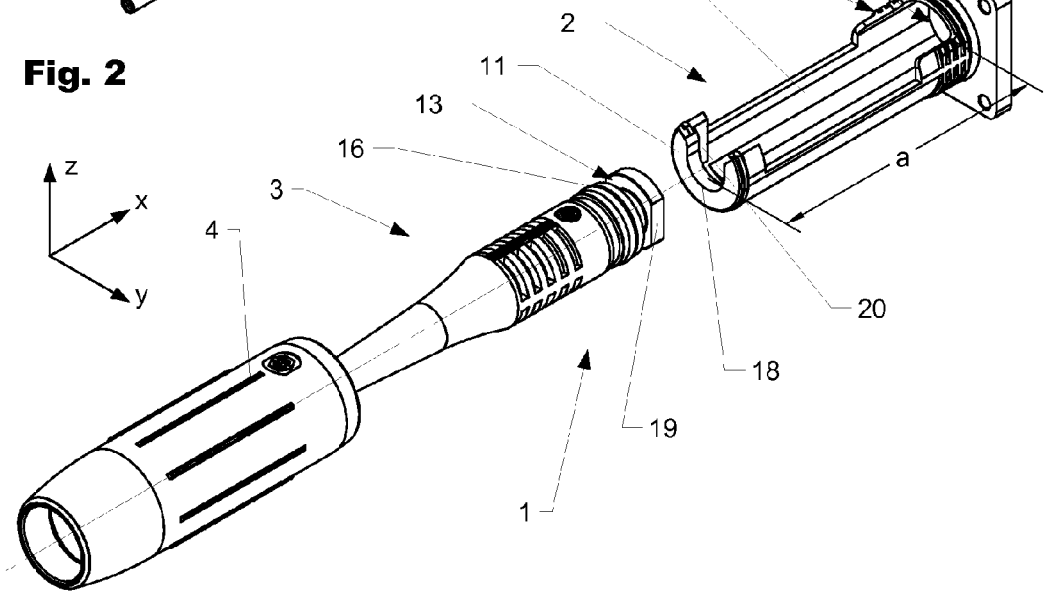

CABLE INSERTION HAVING UPSTREAM MOUNTING FIXTURE

CROSS REFERENCE TO RELATED APPLICATIONS

The present application is a 35 U.S.C. §371 National Phase conversion of PCT/EP2008/068138, filed Dec. 22, 2008, which claims benefit of Swiss Application No. 232/08, filed Feb. 16, 2008, the disclosure of which is incorporated herein by reference. The PCT International Application was published in the German language.

BACKGROUND

1. Field of the Disclosure

The present disclosure relates to the field of cable entries for cables into housings, in particular optical cables, according to the preamble of the independent patent claims.

2. Related Art

Cable entries for inserting cables into housings are known from the prior art, which at the same time are used as strain relief or for kink protection. Typical representatives of this generic type have a cap with an opening which is surrounded by a thread. The opening is normally suitable for holding a chuck, which can be drawn in by a cap nut which interacts with the thread. These solutions are not suitable for situations in which cables must be connected to plugs. In general, the cable entries that are known from the prior art are used at the same time for electrical shielding, and/or for electrically conductive connection of an outer conductor to a housing.

The cable entries which are known from the prior art are not suitable, or are suitable only to a restricted extent, for use with optical waveguides (glass fibers). In contrast to conventional cable entries, optical waveguides result in particular requirements since they are typically delivered prefabricated with one or more plugs provided. The cable entry should therefore also offer the capability to hold a cable with plugs. Complex plug-like apparatuses are known in which the connectors for the optical waveguide are firmly integrated in an outer housing. These have a very complicated design and are therefore very costly. In general, they also cannot easily be fitted.

A further problem frequently occurs when a multicore cable having a corresponding number of plugs must be connected to a mating piece. For example, in adverse conditions, a fitter frequently has to connect a cable in a very confined space above his head or in confined spatial conditions, with only one hand available in this case.

The cable entries known from the prior art are not suitable for this purpose.

SUMMARY

One object of the invention is to provide an apparatus for connecting a cable to a housing. A further object of the invention is to provide an apparatus for connecting a cable which is provided with one or more plugs to a housing.

The object is achieved by the cable entry defined in the independent patent claims.

One embodiment of a cable entry according to the invention has a connecting apparatus similar to a cantilever arm, to which at least one cable can be attached by means of a cable sheath or an interlocking mating piece. The connecting apparatus has a base with an opening, which is suitable for holding a cable, or a cable with one or more plugs. In general, the base has attachment means, for example in the form of screw holes, by means of which the base can be fitted to a housing. A holding apparatus is arranged a certain distance in front, coaxially or at an angle, and/or arranged laterally offset with respect to the opening, and is used to hold the mating piece.

The holding apparatus is used for (interlocking) connection of one or more mating pieces which are fitted to a cable sheath. Good results are achieved by the mating piece having an undercut which, for example, is formed by a groove by means of which the mating piece can be inserted from the side into a slotted end plate. The mating piece can be secured with respect to the end plate by a securing element, such that it does not fall out.

The end plate is typically located at the front end of a cantilever arm which is fitted such that it projects from the base. The cantilever arm is preferably designed to be skeletal, or is designed such that the cable can be introduced into the opening without any major impediment, or the plug can be operatively connected to a corresponding mating piece. The cantilever arm may consist of one or more webs or, for example, may be in the form of a half shell. Depending on the field of application, the connecting apparatus consists of one or more parts which are produced from metal or from plastic, for example by injection molding. If required, the cantilever arm can also be elastically deformable or can be provided with a joint such that it is appropriately aligned with the cable when pulled obliquely, and is used for kink protection. In certain fields of application, the joint can also be used as a fitting aid, because it improves the accessibility to the opening in the base plate. If required, the joint can be designed such that it can be split, such that the connecting apparatus can be broken down into two parts, with one on the cable side and the other on the housing side. In the extreme, the cantilever arm is arranged on the cable side and is attached to a corresponding connecting piece on the side of the base plate when being fitted.

One advantage of the described cable entry is that the connection of the cable sheath (mechanical strain relief) is separated from the operative connection of the cable or the connection of the plug, respectively.

In one embodiment, the cable entry has a connecting apparatus. The connecting apparatus has a base plate for attaching the connecting apparatus to a housing, an opening for passing a cable through the base plate, and a cantilever arm which projects from the base plate and at whose opposite end a holding apparatus is arranged, which is suitable for holding one or more mating pieces which are fitted to one or more cables. The cantilever arm can be designed to be skeletal, such that the mating piece can be operatively connected to the connecting apparatus before the cable is connected. Good results are achieved if the cantilever arm is in the form of a half shell. The cantilever arm can be used as a (temporary) holder/fitting aid for a transceiver. The holding apparatus may be in the form of a slotted end plate. If required, a twisting protection means can be formed between the mating piece and the holding apparatus, and prevents inadvertent twisting of the cable with respect to the connecting apparatus.

The cable entry according to the invention is suitable, inter alia, for use in mobile radio installations, for a so-called Radio Remote Head (RRH).

BRIEF DESCRIPTION OF THE DRAWINGS

The invention will be explained in more detail with reference to the embodiment which is illustrated in the following figures, in which:

FIG. 1 shows a cable entry in the fitted state, with a cable and a housing;

FIG. 2 shows the cable entry shown in FIG. 1, partially sectioned;

FIG. 3 shows the cable entry shown in FIG. 1, in the broken-down state;

DETAILED DESCRIPTION OF THE EMBODIMENTS

Figure 4:
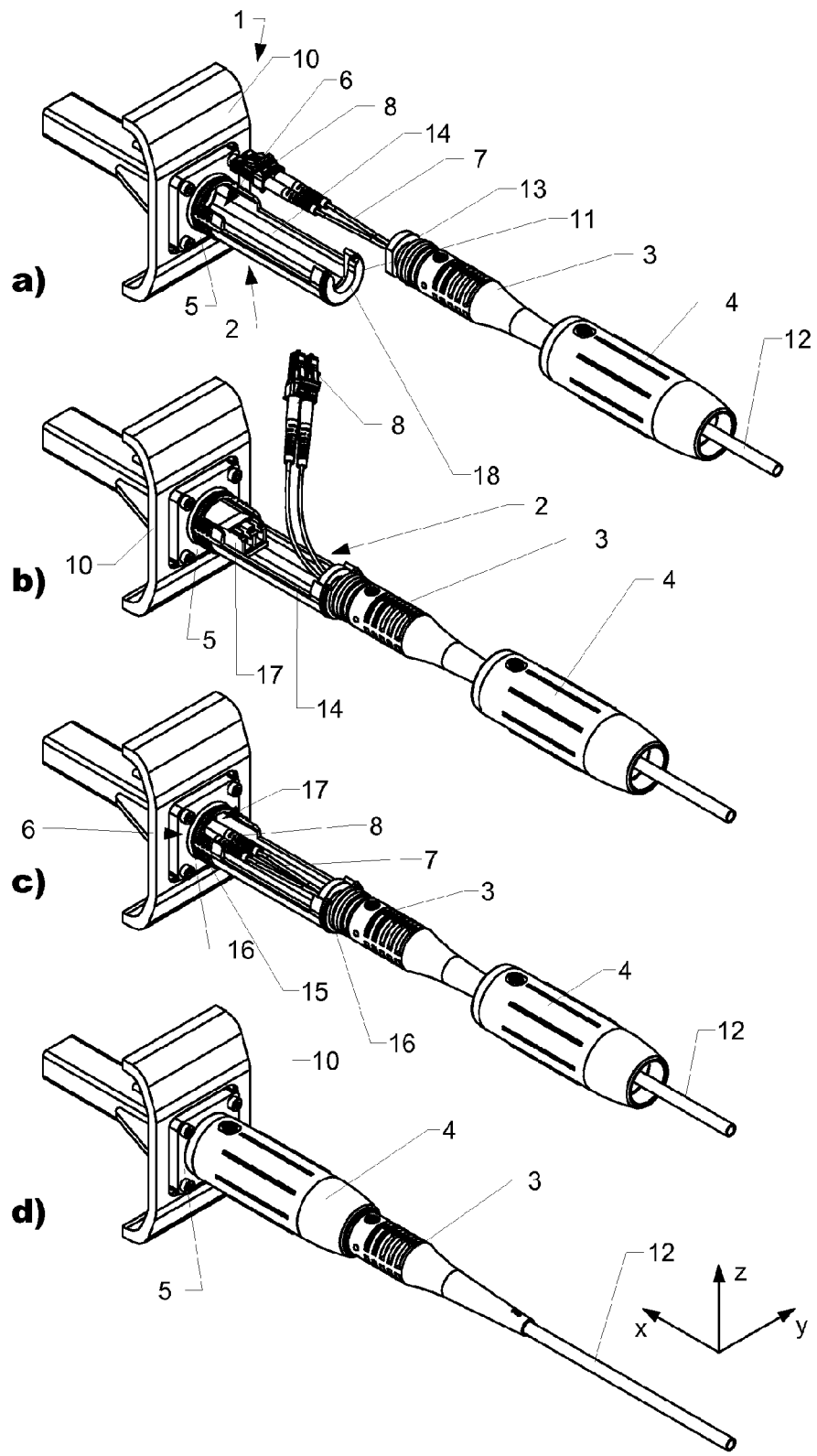
FIG. 4 shows the process of fitting a cable to the cable entry shown in FIG. 1.

FIG. 1 shows a perspective illustration of a cable entry 1 according to the invention, viewed obliquely from above, in the fitted state. FIG. 2 shows the cable entry 1 shown in FIG. 1, in the form of a partially sectioned illustration, such that the interior can be seen. FIG. 3 shows a perspective illustration, obliquely from above, of the cable entry 1 in the disassembled state and broken down into individual parts. Mutually corresponding parts are provided with the same reference symbols.

As can best be seen form FIG. 3, a cable entry 1 according to the invention generally consists of a connecting apparatus 2, a mating piece 3 and a securing element 4. The connecting apparatus 2 has a base 5 (base plate) with an opening 6 which is suitable, for example, for holding a cable 7, or a cable 7 with one or more plugs 8. The illustrated embodiment shows an optical connector (LC connector) which is used for connecting glass fibers 7 to a transceiver 17 (cf. FIG. 2). The base 5 generally has attachment means, for example in the form of screw holes 9, by means of which the base 5 can be fitted to a housing 10. At least one holding apparatus 11 is positioned in front of the opening, coaxially or at an angle or laterally offset with respect to the opening 6, respectively. In the illustrated embodiment, the holding apparatus 11 is arranged coaxially with respect to the opening 6, and at a distance from the latter on a cantilever arm 14 which is in this case in the form of a half shell. In the illustrated embodiment, the cantilever arm 14 is designed such that the transceiver 17 can be pulled out of the housing 10 through the opening 6 for connection of the plugs 8 (cf. FIG. 4*b*). Depending on the field of application and the purpose, other refinements of the cantilever arm 14 are possible, for example with only one or more webs. The illustrated embodiment offers the advantage that the plug 8 can be connected in the area of the opening 6 without any impediment. This would be impossible if the cantilever arm were closed all round.

The holding apparatus 11 is used for interlocking connection of one or more mating pieces 3 which are fitted to a cable sheath 12 (assembly process cf. FIG. 4). Good results are achieved by the mating piece being in the form of a mushroom, or being designed with an undercut or a groove 13, such that it can be latched into a correspondingly designed holding apparatus 11, and can be secured against pulling. For example, the mating piece 3 can be designed to be thicker in a spherical shape at least in places, in order to allow it to be latched into a correspondingly designed socket (holding apparatus) 11, thus resulting in a certain amount of lateral mobility. The mating piece 3 in the illustrated embodiment is manufactured from a comparatively elastic plastic. The mating piece 3 is used on the one hand for transporting tensile forces from the cable sheath 12 to the connecting apparatus 2, and on the other hand for kink protection.

In the illustrated embodiment, the holding apparatus 11 is in the form of a slotted end plate 11 with a side opening 18 into which the mating piece 3 can be hooked at the side, with the groove 13. This refinement and the interlock that it results in prevent inadvertent twisting of the cable 7 with respect to the connecting apparatus 2. For this purpose, at the front end, the mating piece 3 has two mutually opposite parallel flanks 19 (cf. FIG. 3) which, in the assembled state (cf. FIG. 4*b*), correspond in an interlocking manner with corresponding opposing surfaces 20 in the area of the cantilever arm 14. Other options for twisting protection means are possible.

The apparatus is secured by the securing element 4, which in this case is in the form of a sleeve being pushed over the mating piece 3 and the cantilever arm 14, and being screwed to a thread 15 in the area of the base plate. Other securing means are possible. Seals 16 in the form of O-rings close the interior of the cable entry 1 from external influences in the area of the thread 15 and of the end plate 11.

FIG. 4 schematically illustrates the process of fitting a cable 7, which is provided with a mating piece 3, to a connecting apparatus 2, attached to the housing 10 by means of the base plate 5. The cantilever arm 14 projects approximately at right angles from the housing 10.

FIG. 4*a* shows the cable 7 with the mating piece 3 obliquely above the cantilever arm 14 with the end plate 11. The securing element 4, which is in the form of a sleeve, is arranged behind the mating piece 3. In FIG. 4*b*, the mating piece 3 is operatively connected to the holding apparatus 2, by the groove 13 being latched into the opening 18 in the end plate 11, which is slotted at the side. The two plugs 8 are located obliquely above this, before being operatively connected to the transceiver 17, which is pulled out of the housing 10 through the opening 6. The cantilever arm 14 is in the form of a half shell and is in this case used as an opposing bearing (holder). In FIG. 4*c*, the plugs 8 are operatively connected to the transceiver 17, and the transceiver 17 is pushed back again into the housing 10, through the opening 6. In FIG. 4*d*, the securing means 4 is pushed in the x direction over the connecting apparatus 2, and is screwed to the thread 15 in the area of the opening 6. Seals 16 seal the apparatus against external influences.

Figure 5:
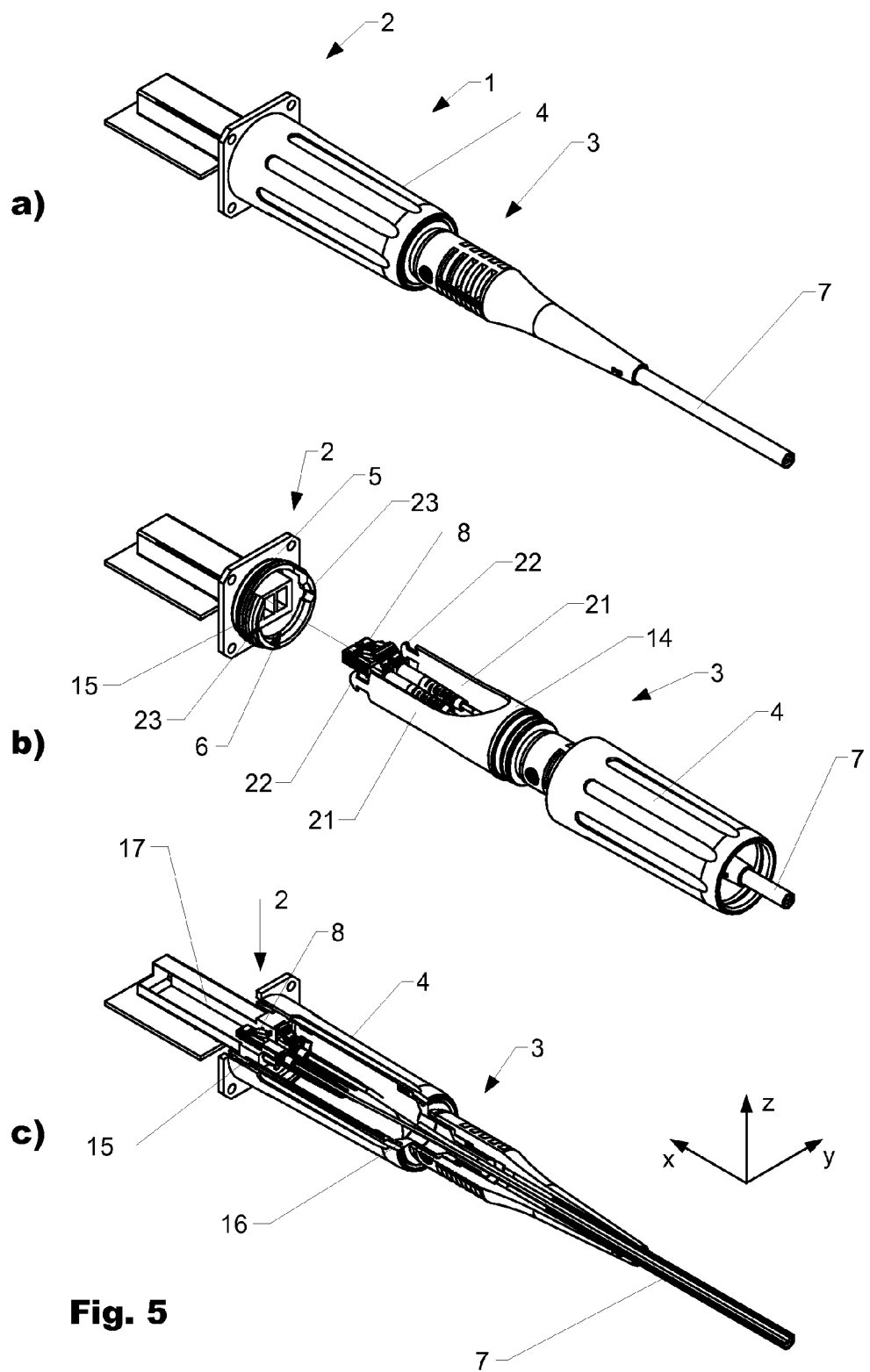
FIG. 5 shows a further embodiment of a cable entry.

FIG. 5 shows a further embodiment of a cable entry 1, in which the cantilever arm is on the cable side and is operatively connected during the fitting process to a corresponding connecting piece on the side of the base plate. FIG. 5*a* shows the cable entry 1 in the fitted state, obliquely from above. FIG. 5*b* shows the cable entry in the disassembled state, and FIG. 5*c* shows a section illustration through the fitted cable entry 1 as shown in FIG. 5*a*, in such a way that the interior can be seen better.

The cable entry 1 consists of a connecting apparatus 2, a mating piece 3 and a securing element 4. The connecting apparatus 2 has a base 5 (base plate) with an opening 6 which is suitable for holding a cable 7 with one or more plugs 8. In the illustrated embodiment, a cantilever arm 14 can be split, with the longer part in this case being arranged on the cable side. In the illustrated embodiment, the cantilever arm 14 has two webs 21 which each have an attachment element 22, which in this case is in the form of a hammer, at the front end. The connecting apparatus 2 has two depressions 23 which, in the fitted state (cf. FIG. 5*c*), correspond with the attachment elements 22 which are in the form of hammers. The webs 21 are designed to be sprung such that the elements 22 which are in the form of hammers can be snapped into the opposite depressions 23. The illustrated embodiment is distinguished by a slimline design which can be produced easily. Other embodiments of the attachment elements are possible. For example, they may be in form of corresponding heels, which can be operatively connected in the lateral direction, from above or from underneath. Another possibility is for the attachment elements to be in the form of a bayonet fitting or thread. Depending on the field of application, the cantilever arm 14 can be connected firmly, or such that it can be split, to the cable 7 or to the mating piece 3. Once the attachment elements 22, which are in the form of hammers, have been snapped into the depressions 23 and the plugs 8 have been connected, the securing element 4 which is in the form of a sleeve is pushed over the cantilever arm 14 and is screwed to a thread 15 on the connecting apparatus 2 (cf. FIGS. 5*a* and 5*c*). The securing element 4, which is in the form of a sleeve, can be designed such that, at least in certain spatial directions, it absorbs a large proportion of the forces which occur and contributes to the robustness of the cable entry, for example in the event of forces in the lateral direction (lateral tension).

The depressions 23 can be arranged internally or externally. The webs 21 and the securing element 4 prevent inadvertent twisting of the cable, and provide relief for the cable against bending moments and tension. Seals 16 can be provided between the mating piece 3 and the securing element 4, and the securing element 4 and the connecting apparatus 2, sealing the cable entry 1 against environmental influences. If required, the cantilever arm 14 can be designed to be elastic or movable to a defined extent. Depending on the field of application, the cantilever arm 14 or the securing element 4 can be attached to the connecting apparatus 2 in a different manner. For example, it is possible to connect the cantilever arm 14 to the connecting apparatus 2 via a screw thread. By way of example, the securing element 4 can be operatively connected to the connecting apparatus 2 via a snap-action connection.

REFERENCE SYMBOLS

1 Cable entry
2 Connecting apparatus
3 Mating piece
4 Securing element
5 Base (base plate)
6 Opening
7 Cable
8 Plug
9 Screw holes
10 Housing
11 Holding apparatus (slotted end plate)
12 Sheath
13 Groove
14 Cantilever arm
15 Thread
16 Seal
17 Optical mating piece (transceiver)
18 Opening in the end plate
19 Flanks (mating piece 3)
20 Opposing surface
21 Web (cantilever arm)
22 Attachment element in the form of a hammer
23 Depression for holding an attachment element in the form of a hammer

What is claimed is:

1. A cable entry for connecting a cable to a housing comprising:
   a connecting apparatus which has a base plate for attaching the connecting apparatus to the housing,
   an opening for passing a cable through the base plate,
   a cantilever arm which projects from the base plate and at whose opposite end a holding apparatus is arranged, which is suitable for holding a mating piece which is fitted to the cable, and
   a securing element in the form of a sleeve, which can be pushed over the connecting apparatus,
   the connecting apparatus includes in the area of the base plate a securing means by which the securing element in the area of the base plate is connected to the connecting apparatus.

2. The cable entry as claimed in claim 1, wherein the cantilever arm is in the form of a separate part and is operatively connected to the connecting apparatus via interlocking operative connecting means.

3. The cable entry as claimed in claim 2, wherein the operative connecting means comprises an attachment element which is in the form of a hammer, and a corresponding depression into which the attachment element can be hooked.

4. The cable entry as claimed in claim 2, wherein the operative connecting means is an attachment element in the form of a thread.

5. The cable entry of claim 2, wherein the operative connecting means is an attachment element in the form of a bayonet fitting.

6. The cable entry as claimed in of claim 1, wherein the cantilever arm is designed to be skeletal, such that the mating piece is operatively connected to the connecting apparatus before the cable is connected.

7. The cable entry as claimed in claim 1, wherein the cantilever arm is in the form of a half shell or has two webs.

8. The cable entry as claimed in claim 1, wherein the cantilever arm is used as a holder for a transceiver.

9. The cable entry as claimed in claim 1, wherein the holding apparatus is an end plate which is slotted at the side.

10. The cable entry as claimed in claim 1, wherein the mating piece is elastic and is used for kink protection.

11. The cable entry as claimed in claim 1, wherein a twisting protection device is arranged between the mating piece and the holding apparatus and prevents inadvertent twisting of the cable with respect to the connecting apparatus.

12. The cable entry as claimed in claim 1, wherein seals are arranged in the area of the base plate and the mating piece.

13. The cable entry as claimed in claim 1, wherein the securing means is a thread or a snap-action connection.

* * * * *

UNITED STATES PATENT AND TRADEMARK OFFICE
CERTIFICATE OF CORRECTION

PATENT NO. : 8,475,200 B2  
APPLICATION NO. : 12/867088  
DATED : July 2, 2013  
INVENTOR(S) : Greub et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 162 days.

Signed and Sealed this

Eighth Day of September, 2015

Michelle K. Lee
*Director of the United States Patent and Trademark Office*